United States Patent
Kim et al.

(10) Patent No.: US 7,394,788 B2
(45) Date of Patent: Jul. 1, 2008

(54) METHOD AND SYSTEM FOR SETTING TCP PROXY TO REDUCE PACKET LOSS AND TRANSMISSION DELAY IN WIRE/WIRELESS INTEGRATED IP NETWORK

(75) Inventors: Won-Ik Kim, Seoul (KR); Seung-Kwon Baek, Kyungju (KR); Jong-Chan Lee, Daejeon (KR); Pyeong-Jung Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 465 days.

(21) Appl. No.: 10/965,971

(22) Filed: Oct. 15, 2004

(65) Prior Publication Data
US 2005/0141455 A1    Jun. 30, 2005

(30) Foreign Application Priority Data
Dec. 27, 2003    (KR) ............... 10-2003-0098220

(51) Int. Cl.
*H04Q 7/00* (2006.01)
(52) U.S. Cl. .................... 370/331; 370/328
(58) Field of Classification Search ............... 370/331, 370/332, 328; 455/436
See application file for complete search history.

(56) References Cited

U.S. PATENT DOCUMENTS

2001/0047474 A1* 11/2001 Takagi et al. ............... 713/151
2003/0076806 A1* 4/2003 Son et al. .................... 370/338
2003/0117974 A1 6/2003 Kang
2003/0235206 A1* 12/2003 Heller ........................ 370/467

FOREIGN PATENT DOCUMENTS

| KR | 10-2001-0001928 A | 1/2001 |
| KR | 1020030034556 A | 5/2003 |
| KR | 10-2003-0050897 A | 6/2003 |
| KR | 1020030054981 A | 7/2003 |

OTHER PUBLICATIONS

Bakre, Ajay, et al., "I-TCP: Indirect TCP for Mobile Hosts," IEEE, 1995, pp. 136-143.
"An Efficient TCP Mechanism for Mobile IP Handoffs" by Jae-Woo Kwon, et al.; *Mobile IP*, 2002; pp. 501-509, Oct. 2002.

* cited by examiner

*Primary Examiner*—Lewis G West
(74) *Attorney, Agent, or Firm*—Blakely, Sokoloff, Taylor & Zafman LLP

(57) ABSTRACT

A method for performing a handover includes: (a) a wireless network controller receiving a handover request message from the mobile station; (b) during an acknowledgement of the handover of the mobile station after receiving the handover request message, the wireless network controller generating a TCP proxy and converting a terminal connection TCP to a split connection TCP; (c) the TCP proxy acknowledging the reception of a packet from the server during the handover on behalf of the mobile station; (d) the TCP proxy storing a packet received from the server in a cache; and (e) upon receiving a handover registration message, the wireless network controller transmitting the packet stored in the cache to the mobile station.

7 Claims, 6 Drawing Sheets

METHOD AND SYSTEM FOR SETTING TCP PROXY TO REDUCE PACKET LOSS AND TRANSMISSION DELAY IN WIRE/WIRELESS INTEGRATED IP NETWORK

CROSS REFERENCE TO RELATED APPLICATION

This application claims priority to and the benefit of Korea Patent Application No. 2003-98220 filed on Dec. 27, 2003 in the Korean Intellectual Property Office, the entire content of which is incorporated herein by reference.

BACKGROUND OF THE INVENTION (a) Field of the Invention

The present invention relates to a method and system for setting a TCP (Transmission Control Protocol) proxy to reduce a packet loss and a transmission delay during a handover in an Internet network. More specifically, the present invention relates to a method for eliminating a packet loss and a transmission delay in a long-term disconnection situation caused by the handover of a mobile station because a split connection TCP is applied to the mobile station using a terminal connection TCP proxy only during a handover of the mobile station in a wire/wireless integrated IP network.

The present invention is also related to a TCP control during a handover in a wireless IP network, and more particularly, to an apparatus for packet transmission in a wire/wireless integrated network that performs a TCP for preventing a deterioration of network performance by a TCP performing a congestion control technique to lower the packet transmission rate of a transmitter (server) on the assumption that congestion causes a packet loss on the wireless link.

(b) Description of the Related Art

Assuming that a packet loss results from congestion, the TCP slow-start and congestion control according to the prior art is applied to reduce the threshold of a retransmission timeout of a transmitter to half of the size of a congestion control window, set the size of the congestion control window to "1", and initiate the slow-start.

This process is applied equally to packets lost or delayed during a handover of a mobile station due to the handover, as well as to congestion on the wireless link. Hence, the TCP of the transmitter unnecessarily reduces the size of the transmitter congestion control window to "1", wasting a wire link resource.

Many approaches have been developed to improve this problem. Those approaches can be classified into two methods, as follows.

One method is modification of a TCP between terminals, and the other provides a TCP proxy in the middle of a packet path between two terminal systems connected to each other through a TCP connection.

The TCP modification method has the difficulty in implementation in an actual situation because all the existing terminals established as a wire infrastructure should be modified in the TCP modification method. The other method is an approach widely used to overcome the difference between different network environments that relates to a split connection TCP (or an indirect-TCP) between a transmitter (hereinafter referred to as "server") and a final receiver (hereinafter referred to as "mobile station"). In the split connection TCP, the base station is designated as a wire/wireless link separation unit acting as a TCP proxy that receives a packet transmitted from the server to the mobile station, transmits an acknowledgement (hereinafter referred to as "ACK") message to the server on behalf of the mobile station, and buffers a packet received from the server. Therefore, the base station serves as a transmitter in charge of reliable packet transmission to the mobile station. This method enables many wireless TCPs to use the proxy with advantages of a local restoration function and a disconnection processing function.

However, the split connection TCP is based on transmission errors caused by the wireless environment with no consideration of a long-term disconnection situation such as a handover of the receiver, resulting in difficulty in completely eliminating a packet loss and a transmission delay occurring during a handover of the mobile station. In addition, the base station must serve as a TCP proxy for all the mobile stations belonging to its cell which causes an overload such as overflow.

SUMMARY OF THE INVENTION

It is an advantage of the present invention to provide a method and system for preventing a packet loss and a transmission delay without an overload on the TCP proxy in a handover of a wire/wireless integrated IP network.

In one aspect of the present invention, there is provided a mobile communication system that includes a wire IP (Internet Protocol) network and a wireless network controller to provide a connection between a receiver (mobile station) and a transmitter (server) through a wire/wireless integrated transmission path. The wireless network controller includes: a handover recognition processor for detecting a handover start or end time of the mobile station; and a TCP (Transmission Control Protocol) proxy controller for performing a TCP proxy operation only during a handover period according to the detection result of the handover recognition processor to generate a split connection TCP session between the server and the wireless network controller and between the mobile station and the wireless network controller.

In another aspect of the present invention, there is provided a method for setting a TCP proxy that includes: (a) a wireless network controller receiving a handover request message from the mobile station; (b) the wireless network controller generating a TCP proxy and converting a terminal connection TCP to a split connection TCP during an acknowledgement of the handover of the mobile station after receiving the handover request message; (c) the TCP proxy acknowledging the reception of a packet from the server during the handover on behalf of the mobile station; (d) the TCP proxy storing a packet received from the server in a cache; and (e) upon receiving a handover registration message, the wireless network controller transmitting the packet stored in the cache to the mobile station.

The method for setting a TCP further includes: (f) the wireless network controller deactivating the TCP proxy and converting the split connection TCP to the terminal connection TCP after transmitting all the packets stored in the cache.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals. A connection between one part to another includes a direct connection between them, or an electrical connection via a third unit.

Hereinafter, a system and method for setting a TCP proxy to reduce packet loss and transmission delay during a handover in an Internet network according to an embodiment of the present invention will be described with reference to the accompanying drawings.

Figure 1A:
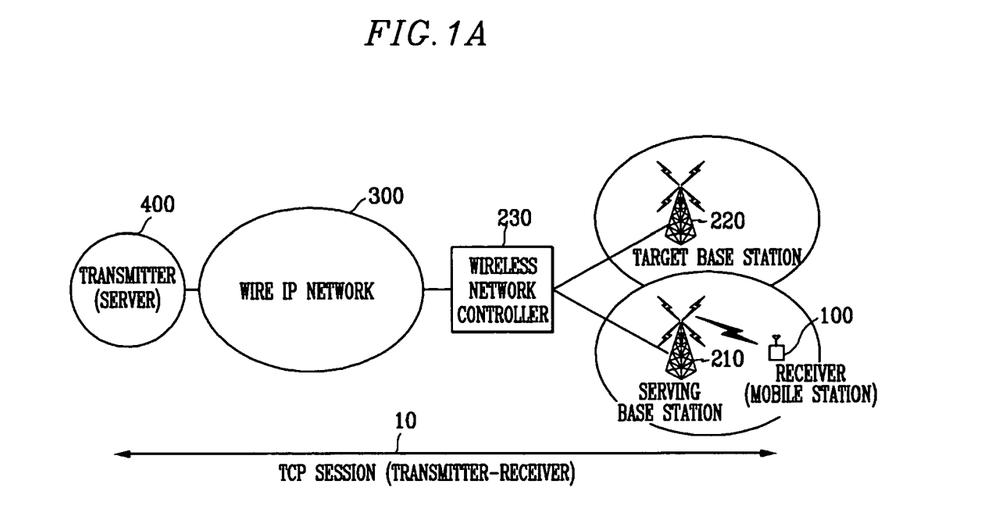
FIG. 1a shows a network environment for an embodiment of the present invention.

FIG. 1a shows a network environment for an embodiment of the present invention.

The network environment for an embodiment of the present invention has an integrated structure of a mobile communication system network and a wire IP network 300. The mobile communication system network comprises a serving base station 210 for providing a mobile communication service to a receiver (mobile station) 100, a target base station 210 to which the mobile station is moving, and a wireless network controller (RNC) 230 for controlling the base stations. The wire IP network 300 is connected to a transmitter (server) 400.

The transmitter 400 and the receiver 100 operate according to a terminal connection TCP when the mobile station 100 receives a communication service in a cell of the serving base station 210.

Figure 1B:
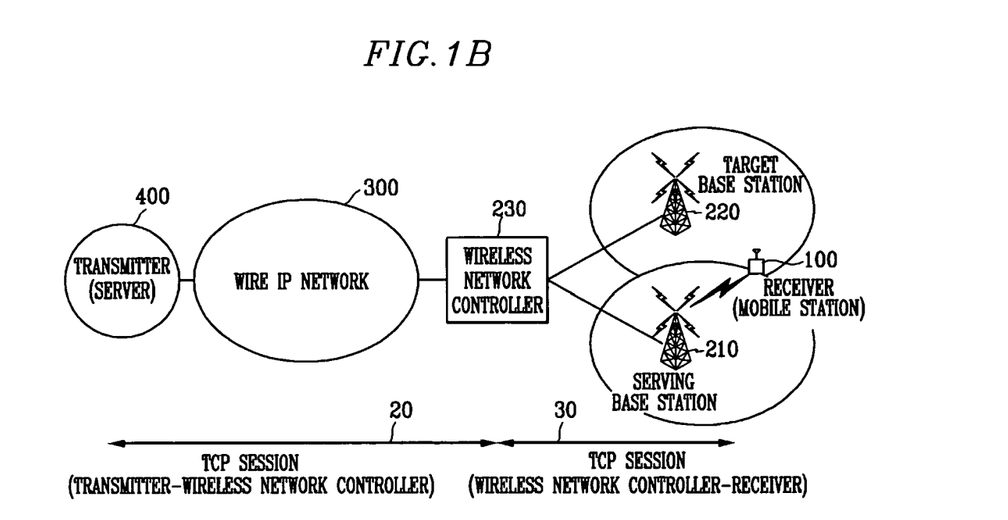
FIG. 1b shows another network environment for an embodiment of the present invention.

FIG. 1b shows another network environment for an embodiment of the present invention.

Referring to FIG. 1b, a change of the TCP session during a handover in an embodiment of the present invention is illustrated. When the mobile station 100 is involved in a handover, the existing terminal connection TCP session is divided into two TCP sessions centering on the wireless network controller 230: a wire network TCP session 20 from the transmitter to the wireless network controller 230, and a wireless network TCP session 250 from the wireless network controller 230 to the receiver 100. The two TCP sessions return to the terminal connection TCP session of FIG. 1a after a handover of the mobile station to the cell of the target base station 220.

Namely, the wireless network controller 230 that is an intermediate node of the terminal connection TCP session and includes a micro handover control module built therein that is activated as a TCP proxy for a link session of the corresponding mobile station at the start of a handover of the mobile station, so as to avoid a retransmission timeout at the TCP transmitter (wire terminal) caused by the handover of the mobile station. The wireless network controller has enhanced adaptive TCP performance to return to the terminal connection TCP when the base station has no need to serve as a TCP proxy after the handover of the mobile station.

Figure 2:
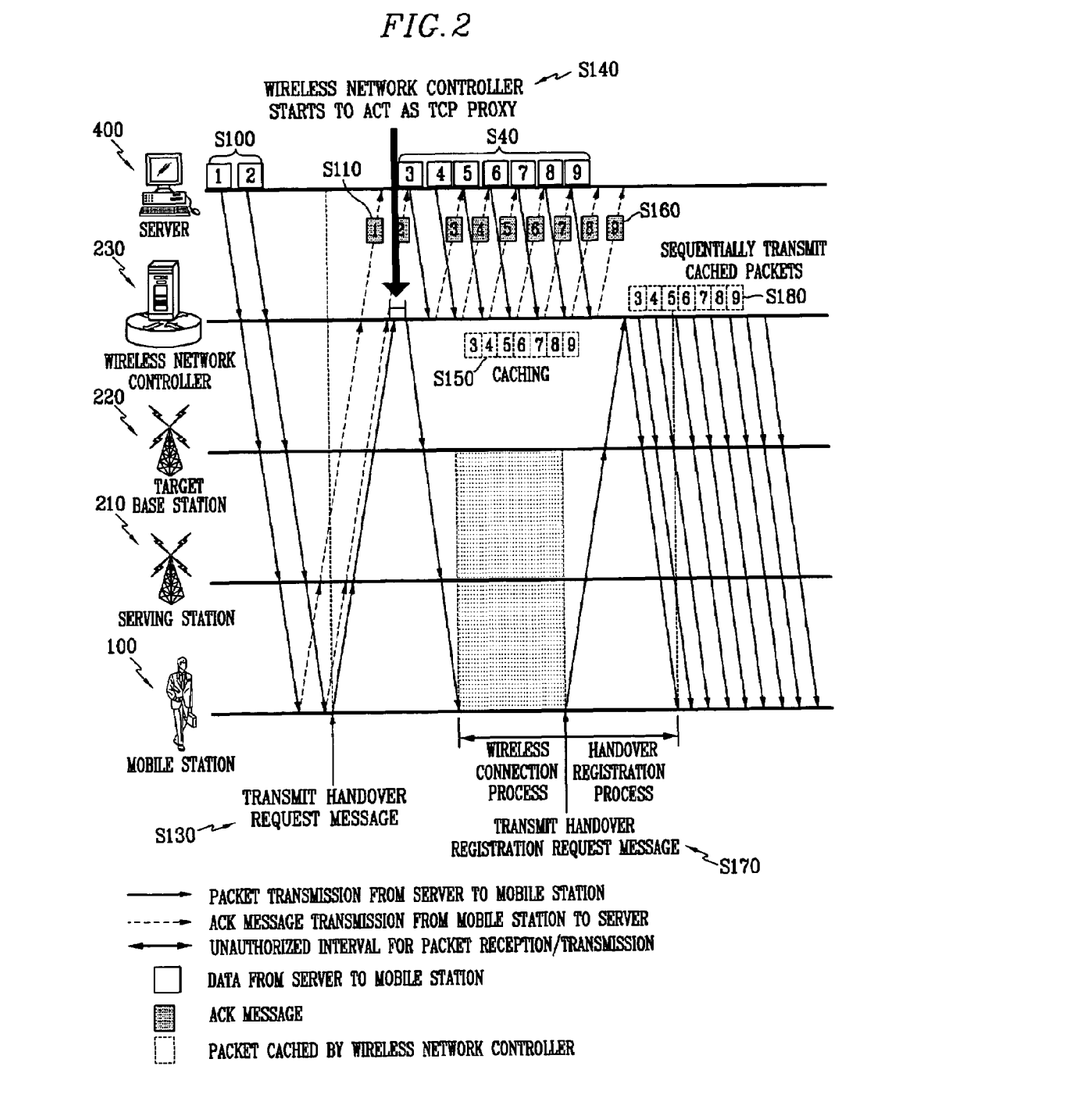
FIG. 2 is a signal flow chart of a process for processing a TCP session of a wireless network controller according to an embodiment of the present invention.

FIG. 2 is a signal flow chart of a process for processing a TCP session of a wireless network controller according to an embodiment of the present invention.

Reference will be made to FIG. 2 to describe a processing of the TCP session at the wireless network controller 230 during a handover of the mobile station.

With a good wireless link of the mobile station 100 to the serving base station 210, the server 400 transmits first and second packets to the mobile station 100, in S100. Upon receiving the first and second packets, the mobile station transmits an ACK message for the first and second packets to the server 400, in S110.

This corresponds to the terminal connection TCP. When the mobile station 100 gets out of the serving base station area and attempts a handover to an adjacent cell because of an unstable wireless link, it transmits a handover request message to the wireless network controller 230, in S130.

When a wireless resource of the target base station 220 is available, the wireless network controller 230, upon receiving the handover request message, transmits a handover ACK message to the mobile station 100 to perform a handover process and serves as a TCP proxy 340, in S140.

The packets 40 transmitted from the server 400 to the mobile station 100 are cached according to the TCP proxy of the wireless network controller 230, in S150. The wireless network controller 230 also transmits ACK messages to the server 400 on behalf of the mobile station 100, in S160. Hence, the server cannot recognize the handover situation of the mobile station to maintain the packet transmission rate even when the mobile station 100 is unable to transmit/receive packets because of a handover.

Once a wireless connection to a new base station is established, the mobile station 100 transmits a handover registration request message to the wireless network controller 230 to receive an acknowledgement of a handover to a new cell, in S170.

Upon receiving the handover registration request message, the wireless network controller 230 considers that the handover of the mobile station 100 is completed, and sequentially transmits the cached packets with a handover registration ACK message to the wireless network controller 230 via the new base station, in S180.

For a rapid removal of the packets from the cache, the wireless network controller 230 transmits the ACK message to the server slowly within a range of the transmission time of the ACK message, not causing a retransmission timeout of the server. In this manner, the wireless network controller 230 transmits all the packets of the cache to the mobile station, and upon receiving an ACK message from the mobile station, cancels the TCP proxy to return to the terminal connection TCP.

Hereinafter, reference will be made to FIG. 3 to describe a schematic of a TCP proxy device for processing a split connection TCP session by the wireless network controller during a handover of the mobile station according to the above flow chart. The operations of the respective sections will be described in detail with reference to FIGS. 4, 5, and 6.

Figure 3:
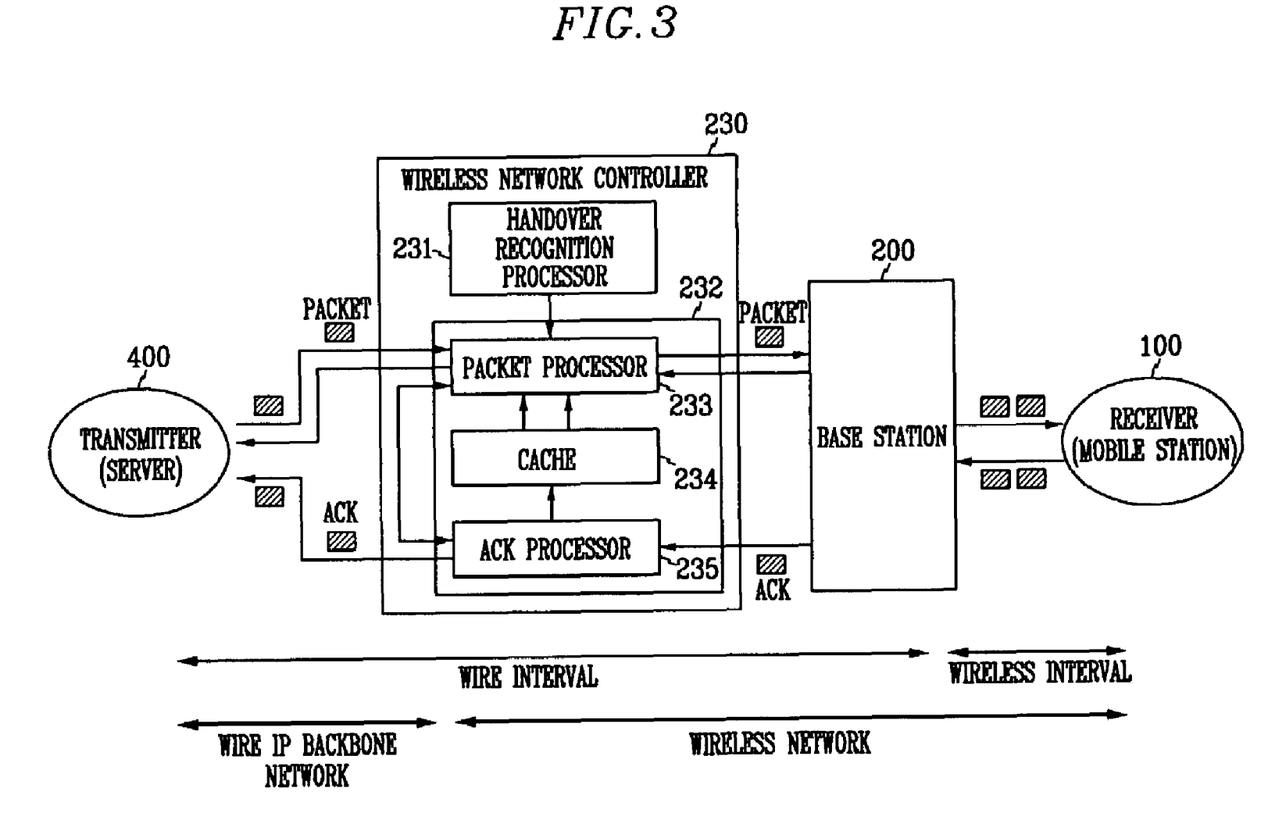
FIG. 3 is a schematic block diagram of the wireless network controller according to an embodiment of the present invention.

FIG. 3 is a schematic block diagram of the wireless network controller according to an embodiment of the present invention.

The wireless network controller 230 used in an embodiment of the present invention comprises a handover recognition processor 231, and a TCP proxy controller 232. The TCP proxy controller 232 comprises a packet processor 233, a cache 234, and an ACK processor 235.

The handover recognition processor 231 detects a handover start/end time of the mobile station and requests the TCP proxy controller 232 to generate/cancel the split connection TCP session. Upon receiving the request of the handover recognition processor 231, the TCP proxy controller 232 substantially operates as a TCP proxy by the request.

In the TCP proxy controller 232, the packet processor 233 detects the received packets, stores the detected packets in the cache 234, detects the packets from the cache 234 and transmits the detected packets to the mobile station. The ACK processor 235 transmits an ACK message for the received packets from the packet processor 235 to the server, and receives the ACK message from the mobile station.

The TCP proxy controller 232 operates upon receiving a split connection TCP session generation request from the handover recognition processor, and cancels its operation upon receiving a split connection TCP session cancellation request and without any packet in the cache.

Figure 4:
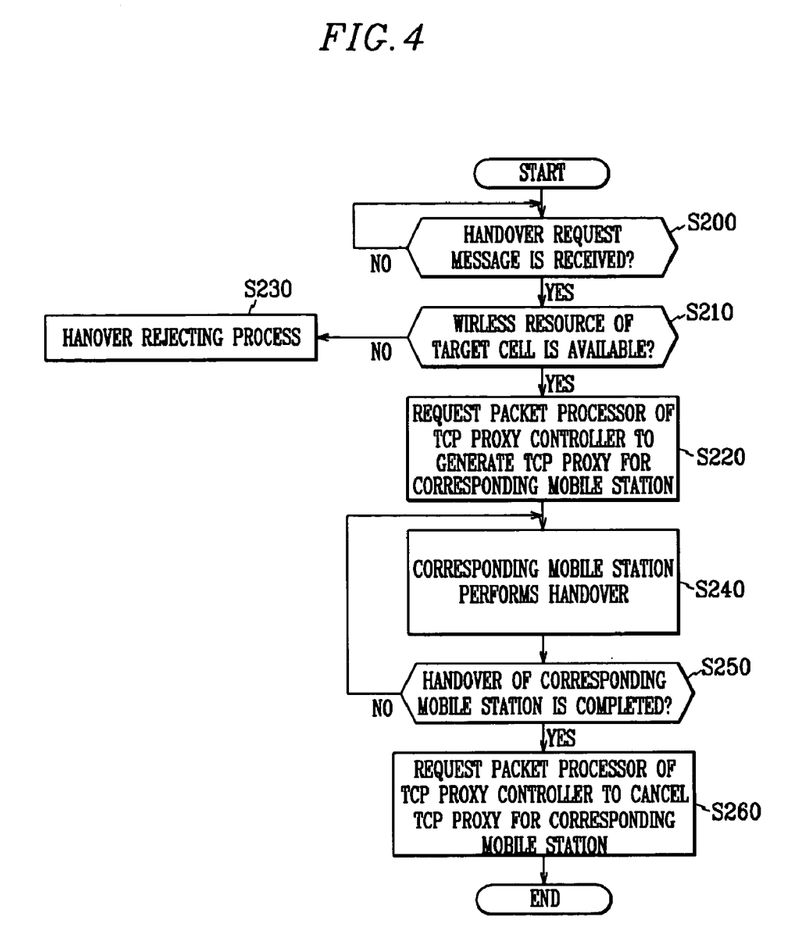
FIG. 4 is a flow chart showing an operation of the wireless network controller according to an embodiment of the present invention.

FIG. 4 is a flow chart showing an operation of the wireless network controller according to an embodiment of the present invention.

The handover recognition processor of the wireless network controller monitors the reception of a handover request message from the mobile station, and upon receiving the handover request message, detects the reception time of the message as a handover end time of the mobile station, in S200.

Upon detection of the handover start time, the handover recognition processor determines in S210 whether or not a wireless resource of a target cell for handover is available.

Without a wireless resource of the target cell available, the wireless network controller performs a handover rejection process (in S230). With a wireless resource of the target cell available, the wireless network controller requests the packet processor of the TCP proxy controller to generate a TCP proxy and configure a split connection TCP session, in S240.

Subsequently, the mobile station performs a handover, in S240, and the wireless network controller monitors the reception of a handover registration message from the mobile station. Upon receiving the handover registration message, the wireless network controller considers that the handover of the mobile station is completed, in S250.

After the completion of the handover, the handover recognition processor requests the packet processor of the TCP proxy controller to cancel the TCP proxy for the mobile station, in S570.

Figure 5:
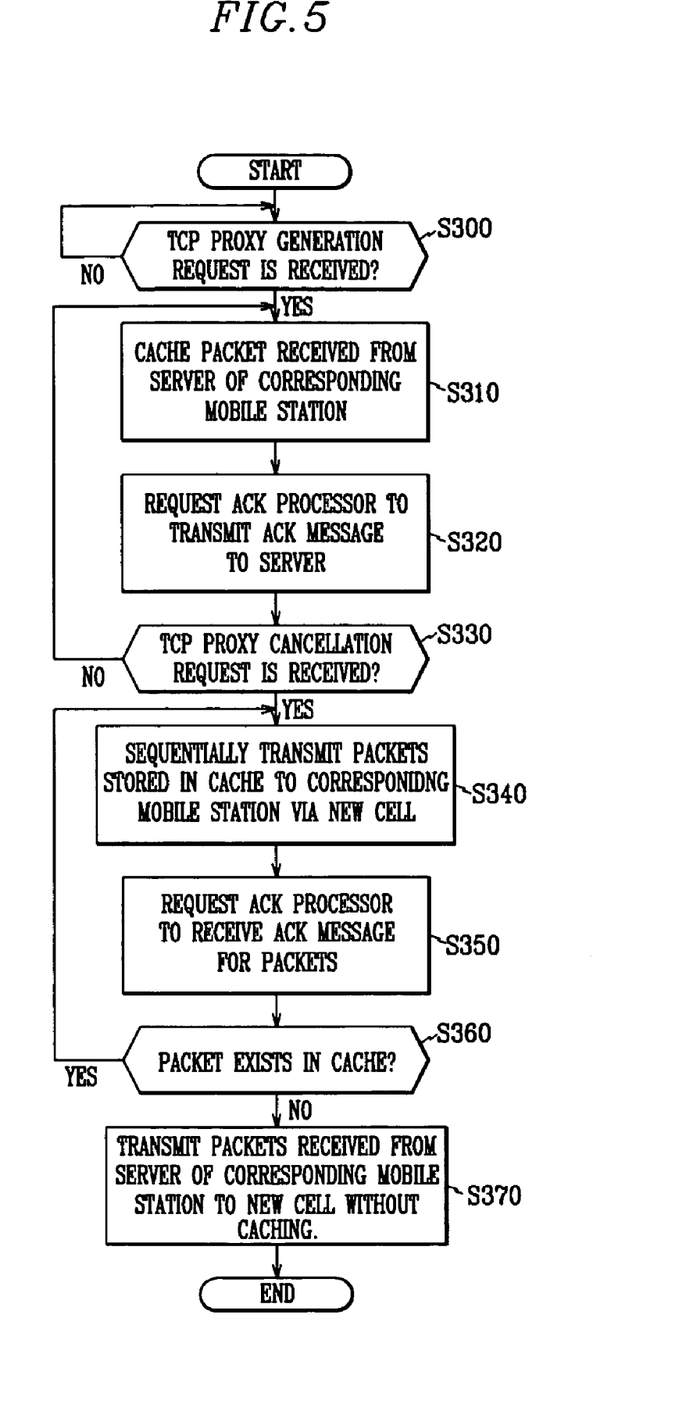
FIG. 5 is a flow chart showing an operation of a TCP proxy controller according to an embodiment of the present invention.

FIG. 5 is a flow chart showing an operation of the TCP proxy controller according to an embodiment of the present invention.

The packet processor of the TCP proxy controller monitors the reception of a TCP proxy generation request by handover from the handover recognition processor, in S300.

Upon receiving the TCP proxy generation request, the TCP proxy controller stores the packet received from the server in the cache, in S310, and requests the ACK processor to transmit an ACK message to the server on behalf of the mobile station, in S320.

In S330, the TCP proxy controller monitors the reception of a TCP proxy cancellation request from the handover recognition processor so as to determine whether or not the handover of the mobile station is completed.

Upon receiving the TCP proxy cancellation request, the TCP proxy controller sequentially transmits the packets stored in the cache to the mobile station, in S340, and requests the ACK processor to process the reception of the ACK message for the packets, in S350.

Subsequently, the TCP proxy controller consistently monitors the existence of packets in the cache, and without a packet in the cache, cancels the TCP proxy and transmits the packets received from the server without caching to return to a terminal connection TCP session, in S370.

Figure 6:
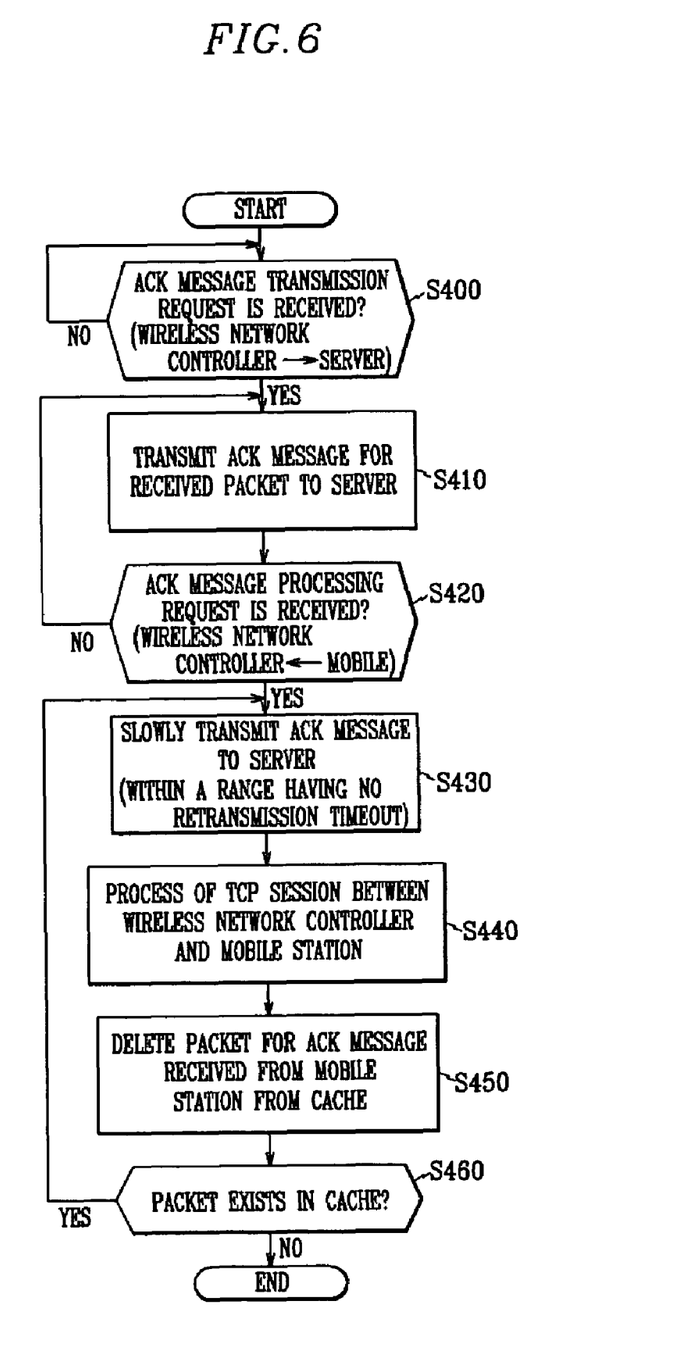
FIG. 6 is a flow chart showing an operation of an ACK processor according to an embodiment of the present invention.

FIG. 6 is a flow chart showing an operation of the ACK processor according to an embodiment of the present invention.

In S400, the ACK processor of the TCP proxy controller monitors the reception of a request for ACK message transmission to the server at the handover start time.

Upon receiving the request for ACK message transmission to the server, the ACK processor transmits an ACK message for the packets received from the server to the server on behalf of the mobile station, in S410.

The ACK message transmission to the server is continued until a request for ACK message processing is received, in S420.

Upon receiving the request of the packet processor to process the ACK message received from the mobile station at the handover timeout of the mobile station, the ACK processor delays the ACK message to the server within a range not causing a retransmission timeout at the server TCP and transmits a delayed ACK, in S430. This is for removing the packets stored in the cache more rapidly to return to a terminal connection TCP session.

The ACK process receives an ACK message transferred from the mobile station, in S440, and deletes a packet corresponding to the received ACK message of the mobile station from the cache, in S450.

It is consistently monitored whether or not there is a packet in the cache. Without any packet in the cache, the ACK processor recognizes it as a TCP proxy cancellation and terminates its operation.

According to the above-described embodiments of the present invention, a TCP proxy is generated at a handover start time of the mobile station, and the split connection TCP is used after the completion of the handover until packets are all removed from a cache of the TCP proxy. With the cache empty, the split connection TCP is returned to the terminal connection TCP.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The present invention applies a split connection TCP to a mobile station using a terminal connection TCP only during a handover period in a wire/wireless integrated IP network, so as to prevent a TCP congestion control of the wire transmitter even with a long-term disconnection caused by the handover and thereby to reduce an abrupt decrease in the packet transmission rate of the wire transmitter.

Furthermore, according to the configuration of the present invention, the wireless network controller is designated as a separation point functioning as a TCP proxy in a split connection TCP to eliminate a packet loss possibly occurring in a handover and overcome the conventional problem with the handover in the split connection TCP, which is then returned to the terminal connection TCP after the completion of the handover, minimizing a load caused by the function of the wireless network controller as a TCP proxy.

What is claimed is:

1. A mobile communication system, which includes a wire IP (Internet Protocol) network and a wireless network controller to provide a connection between a mobile station and a server through a wire/wireless integrated transmission path,
the wireless network controller comprising:
a handover recognition processor for detecting a handover start or end time of the mobile station;
and a TCP (Transmission Control Protocol) proxy controller for performing a TCP proxy operation only during a handover period according to the detection result of the handover recognition processor to generate a split connection TCP session between the server and the wireless network controller and between the mobile station and the wireless network controller the TCP proxy controller comprising:
an acknowledgement (ACK) message processor for transmitting a handover ACK message to the mobile station to perform a handover process and transmitting an ACK message to the server on behalf of the mobile station.

2. The mobile communication system as claimed in claim 1, wherein the TCP proxy controller comprises:
a cache for inputting/outputting a packet and storing the input/output packet;
a packet processor for receiving the packet from the server and storing the received packet in the cache in generating a TCP proxy, and transmitting the stored packet to a base station having the mobile station belonging thereto in canceling the TCP proxy; and
wherein the acknowledgement (ACK) message processor transmits an ACK message to the server on behalf of the mobile station with a packet stored in the cache, and deletes the corresponding packet from the cache upon receiving an ACK message of the mobile station.

3. The mobile communication system as claimed in claim 2, wherein the handover recognition processor transmits a TCP proxy generation request to the packet processor upon receiving a handover request message from the mobile station, and transmits a TCP proxy cancellation request upon receiving a handover registration message.

4. The mobile communication system as claimed in claim 2, wherein upon receiving an ACK message reception request from the mobile station, the ACK message processor delays the ACK message within a retransmission time range defined by TCP and transmits the delayed ACK message.

5. A method for setting a TCP proxy, which is for setting a TCP proxy during a handover of a mobile station in a mobile communication system providing a connection between the mobile station and a server through a wire/wireless integrated transmission path, the method comprising:
(a) a wireless network controller receiving a handover request message from the mobile station;
(b) the wireless network controller generating a TCP proxy and converting a terminal connection TCP to a split connection TCP during an acknowledgement of the handover of the mobile station after receiving the handover request message;
(c) the TCP proxy acknowledging the reception of a packet from the server during the handover on behalf of the mobile station;
(d) the TCP proxy storing a packet received from the server in a cache;
(e) upon receiving a handover registration message, the wireless network controller transmitting the packet stored in the cache to the mobile station;
(f) after transmitting all packets stored in the cache, the wireless network controller deactivating the TCP proxy and converting the split connection TCP to the terminal connection TCP; and
(g) upon receiving the packet stored in the cache, the mobile station transmitting an ACK processing recwest message to the wireless network controller and deleting the packet corresponding to the ACK message from the cache and with all packets deleted from the cache, the wireless network controller canceling the TCP proxy and returning to a terminal connection TCP.

6. The method as claimed in claim 5, further comprising: setting a session of the split connection TCP between the server and the wireless network controller and between the wireless network controller and the mobile station.

7. The method as claimed in claim 6, further comprising: upon receiving the ACK processing request message, the wireless network controller delaying a transmission rate of the ACK message to the server within a retransmission time range at the server and the TCP.

* * * * *